Patented Feb. 17, 1948

2,436,069

UNITED STATES PATENT OFFICE 2,436,069

OILS AND GREASES OBTAINED BY PYROLYSIS OF TETRAFLUOROETHYLENE-OLEFIN COPOLYMERS

Robert M. Joyce, Jr., Wilmington, Del., assignor to E. I. du Pont de Nemours & Company, Wilmington, Del., a corporation of Delaware No Drawing. Application September 29, 1944, Serial No. 556,488

4 Claims. (Cl. 260—80)

This invention relates to chemical processes and more particularly to the production of unsaturated oils, greases, and waxes.

This invention has as an object a process for obtaining unsaturated products consisting of oils or greases. A further object is to provide new and useful products and mixtures thereof. Other objects will appear hereinafter.

The above objects are accomplished by the thermal cracking of tetrafluoroethylene/monoolefinic hydrocarbon copolymers.

The tetrafluoroethylene/monoolefinic hydrocarbon copolymers used in the practice of this invention can be obtained by heating a mixture of tetrafluoroethylene and the monoolefinic hydrocarbon under pressure at a temperature in the range of 40–150° C. in the presence of water and oxygen or a peroxy catalyst. These copolymers are normally solid, tough, essentially free of unsaturation and are capable of forming unsupported films. When heated at their melting points, they form extremely viscous molten masses.

In the process of this invention the tetrafluoroethylene/monoolefinic hydrocarbon copolymers are cracked by heating within the range of 400° C.–700° C. under subatmospheric, atmospheric, or superatmospheric pressure. Under such conditions the copolymers pyrolyze to form lower molecular weight fluorine-containing unsaturated products ranging from oils and soft greases to hard waxes which flow freely when maintained in the molten condition. The degree of unsaturation of the resultant mixture is dependent on the nature of the starting material. For example, in the cracking of tetrafluoroethylene/monoolefinic hydrocarbon copolymers containing large proportions of monoolefinic hydrocarbons, the pyrolysis products contain more double bonds than do products obtained by the pyrolysis of copolymers containing larger amounts of tetrafluoroethylene. In the cracking of the tetrafluoroethylene/monoolefinic hydrocarbon copolymers the double bonds are formed only by the rupture of the carbon-carbon chain because there is no splitting out of hydrogen fluoride or fluorine since the resultant products have essentially the same fluorine content as the starting material. This is indeed surprising because in the cracking of polymers such as ethylene/vinyl acetate and ethylene/vinyl chloride copolymers loss of acetic acid and hydrogen chloride occurs with the resultant formation of double bonds. Similarly, pyrolysis of tetrafluoroethylene/vinyl acetate copolymer results in the removal of acetic acid whereas pyrolysis of chlorotrifluoroethylene/ethylene, vinylidene fluoride/ethylene and vinylfluoride/ethylene copolymers result in the splitting out of hydrogen halides. The tetrafluoroethylene/monoolefinic hydrocarbon copolymers are unique in that the formation of double bonds in the pyrolysis products result only from the rupture of the carbon-carbon chain.

It is thus apparent that in the production of unsaturated products by the process of the present invention, the degree of unsaturation is dependent primarily upon the ratio of the average chain length of the starting material to the average chain length of the pyrolysis product, i. e., on the number of carbon-carbon bonds broken during the pyrolysis reaction. Generally the products of this invention are leaginous or unctuous materials consisting of oils or greases, which may be either soft greases or hard waxy solids, and have a percentage unsaturation of at least 25. Percentage unsaturation is determined by calculation using the following equation:

$$\text{Percentage unsaturation} = \frac{\text{molecular weight} \times \text{iodine number}}{254}$$

The invention is illustrated by the following examples in which parts are by weight.

Example I

Twenty-one parts of a tetrafluoroethylene/isobutylene copolymer containing 47.8% fluorine, which corresponds to a mol ratio of tetrafluoroethylene:isobutylene=1:1.05; or 49 mol per cent of tetrafluoroethylene, is placed in a vessel which is evacuated to a pressure of 1 mm. while a slow stream of nitrogen is bled in through a capillary. The vessel is heated in a metal bath at a temperature of 425–460° C. for 1½ hrs. while a distillate slowly collects in a water-cooled receiver. There is obtained 14 parts of a dark, greasy distillate while a residue of 3 parts remains in the reaction vessel. A trap cooled in a solid carbon dioxide-methanol mixture between the receiver and the vacuum pump contains 2 parts of an oil and 2 parts of water from the incompletely dry polymer. A test for fluoride ion in the water disclosed not more than a trace present.

The greasy distillate had a molecular weight of 755 and an iodine number of 20.55 which corresponds to a percentage unsaturation of 60.9. The non-liberation of hydrogen fluoride from the polymer during the cracking process is indicated by the materials balance, by the fluorine content of the distillate (44.4%) and by the absence of more than a trace of fluoride ion in the water in the cold trap.

*Example II*

Fifteen parts of a tetrafluoroethylene/ethylene copolymer containing 31.2% fluorine which corresponds to a mol ratio of tetrafluoroethylene:ethylene=1:5.14 and 16.3 mol per cent of tetrafluoroethylene is placed in a vessel which is then evacuated to 5 mm. and heated at 430–450° C. for 45 min. During this period 12 parts of a hard, waxy distillate is collected in a water-cooled receiver. Three parts of residue remain in the pyrolysis vessel. The distillate contains 32.0% of fluorine and has a molecular weight of 947 (ebullioscopic in benzene) and an iodine number of 27.0, corresponding to a percentage unsaturation of 101.

Although the invention is illustrated by the pyrolysis of tetrafluoroethylene/ethylene and tetrafluoroethylene/isobutylene copolymers, it is applicable to copolymers of tetrafluoroethylene with olefinic hydrocarbons containing up to 4 carbon atoms. Examples of other olefinic hydrocarbons are propylene and butylene. The invention is also applicable to the pyrolysis of tetrafluoroethylene/olefinic hydrocarbon copolymers containing more than one olefinic hydrocarbon, e. g., tetrafluoroethylene/ethylene/isobutylene copolymer.

The copolymers of tetrafluoroethylene/monoolefinic hydrocarbons which can be pyrolyzed by the process of this invention contain on the basis of these copolymer constituents from 1–80 mol per cent of tetrafluoroethylene. Polymers containing higher percentages of tetrafluoroethylene give, upon pyrolysis, products essentially identical to those obtained by pyrolyzing polytetrafluoroethylene. Particularly valuable pyrolysis products are obtained when tetrafluoroethylene/monoolefinic hydrocarbon copolymers contain 10–60 mol per cent of tetrafluoroethylene are employed because these pyrolysis products are most valuable, for example, as lubricants, because of their relatively high fluorine contents and their viscosity characteristics.

In pyrolyzing the tetrafluoroethylene/monoolefinic hydrocarbon copolymers the reaction is generally carried out at a temperature in excess of 400° C. In general, temperatures beyond about 700° C. lead to the extensive production of low molecular weight degradation products.

As a further modification of the present process, certain catalysts can be employed during the cracking operation. These include such metal catalysts as nickel, cobalt, platinum and iron, certain oxide type catalysts such as alumina, silica, chromium oxide and thorium oxide and polyvalent metal halides such as aluminum chloride, aluminum fluoride and zinc fluoride.

It is desirable to employ a carrier which aids in keeping the reaction mixture well agitated during the cracking process and in removing the reaction product therefrom. This carrier can be an inert gas, such as carbon dioxide, nitrogen, hydrogen, or methane.

The products obtained by the practice of this invention can be used as such for a wide variety of purposes such as ingredients in synthetic waxes, polishes, coatings, drying oils, lubricants, etc. They may be blended with waxes and lubricating oils to obtain products of enhanced value as waxes and lubricants. They may be used as raw materials for chemical synthesis. For example, they may be condensed with aromatic compounds and halogenated compounds to yield blending agents for fuels and lubricants.

As many apparently widely different embodiments of this invention may be made without departing from the spirit and scope thereof, it is to be understood that I do not limit myself to the specific embodiment thereof except as defined in the appended claims.

I claim:

1. A composition of matter which in physical properties ranges from an oil to a grease, which has a percentage unsaturation of at least 25, and which is obtained by heating in an inert atmosphere at a temperature of from 400° C. to 700° C. a normally solid copolymer of tetrafluoroethylene and a monoolefinic hydrocarbon having from 2 to 4 carbon atoms until the copolymer is converted to a product which has said physical properties and percentage unsaturation, said copolymer containing from 10 to 60 mol per cent of tetrafluoroethylene.

2. A process which comprises heating in an inert atmosphere to a temperature of 400° C. to 700° C. a normally solid copolymer of tetrafluoroethylene and a monoolefinic hydrocarbon, and continuing said heating until the copolymer is converted to a product which in physical properties ranges from an oil to a grease, and which has a percentage unsaturation of at least 25, said copolymer containing from 10 to 60 mol per cent of tetrafluoroethylene, and said monoolefinic hydrocarbon containing from 2 to 4 carbon atoms.

3. The composition set forth in claim 1 in which said hydrocarbon is ethylene.

4. The process set forth in claim 2 in which said hydrocarbon is ethylene.

ROBERT M. JOYCE, Jr.

REFERENCES CITED

The following references are of record in the file of this patent:

UNITED STATES PATENTS

| Number | Name | Date |
|---|---|---|
| 2,325,060 | Ingersoll | July 27, 1943 |
| 2,372,001 | Joyce | Mar. 20, 1945 |
| 2,394,581 | Benning et al. | Feb. 12, 1946 |